(12) United States Patent
Kim et al.

(10) Patent No.: US 11,472,949 B2
(45) Date of Patent: Oct. 18, 2022

(54) ETHYLENE/1-BUTENE COPOLYMER HAVING EXCELLENT PROCESSABILITY

(71) Applicant: LG Chem, Ltd., Seoul (KR)

(72) Inventors: Joongsoo Kim, Daejeon (KR); Hyuck Ju Kwon, Daejeon (KR); Yi Young Choi, Daejeon (KR); Ki Soo Lee, Daejeon (KR); Jongsang Park, Daejeon (KR); Daesik Hong, Daejeon (KR); Ye Jin Lee, Daejeon (KR); Jinyoung Kwak, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/956,149

(22) PCT Filed: Dec. 21, 2018

(86) PCT No.: PCT/KR2018/016503
§ 371 (c)(1),
(2) Date: Jun. 19, 2020

(87) PCT Pub. No.: WO2019/125065
PCT Pub. Date: Jun. 27, 2019

(65) Prior Publication Data
US 2020/0339790 A1 Oct. 29, 2020

(30) Foreign Application Priority Data

Dec. 21, 2017 (KR) .......... 10-2017-0177534
Dec. 20, 2018 (KR) .......... 10-2018-0166741

(51) Int. Cl.
*C08L 23/08* (2006.01)
*C08F 4/653* (2006.01)
(Continued)

(52) U.S. Cl.
CPC ........ *C08L 23/0815* (2013.01); *C08F 4/6465* (2013.01); *C08F 4/6592* (2013.01); *C08F 210/16* (2013.01)

(58) Field of Classification Search
CPC .. C08F 210/16; C08F 4/65904; C08F 4/6592; C08F 4/65925; C08L 23/0815
See application file for complete search history.

(56) References Cited

U.S. PATENT DOCUMENTS 6,387,839 B1  5/2002 Jin et al.
8,476,370 B2  7/2013 Backman et al.
(Continued)

FOREIGN PATENT DOCUMENTS

CN  10679540 A  3/2010
CN  105814101 A  7/2016
(Continued)

OTHER PUBLICATIONS

Extended European Search Report including Written Opinion for Application No. EP18893091.1, dated Dec. 7, 2020, pp. 1-7.
(Continued)

*Primary Examiner* — Caixia Lu
(74) *Attorney, Agent, or Firm* — Lerner, David, Littenberg, Krumholz & Mentlik, LLP

(57) ABSTRACT

Provided is an ethylene/1-butene copolymer having excellent processability and stress cracking resistance. The ethylene/1-butene copolymer according to the present invention may be applied to a high-pressure resistant heating pipe, a PE-RT pipe, a large diameter pipe, etc.

15 Claims, 4 Drawing Sheets

(51) Int. Cl.
*C08F 4/6592* (2006.01)
*C08F 210/16* (2006.01)
*C08F 4/646* (2006.01)

(56) References Cited

U.S. PATENT DOCUMENTS

| | | | |
|---|---|---|---|
| 9,290,593 B2 | 3/2016 | Cho et al. | |
| 2004/0005424 A1 | 1/2004 | Krumpel et al. | |
| 2004/0048736 A1 | 3/2004 | Mink et al. | |
| 2005/0267271 A1 | 12/2005 | Mink et al. | |
| 2007/0155620 A1 | 7/2007 | Lavastre et al. | |
| 2010/0121006 A1 | 5/2010 | Cho et al. | |
| 2014/0094574 A1 | 4/2014 | Cho et al. | |
| 2016/0280813 A1 | 9/2016 | Kwon et al. | |
| 2016/0280822 A1 | 9/2016 | Kim et al. | |
| 2017/0044278 A1 | 2/2017 | Lee et al. | |
| 2017/0233511 A1 | 8/2017 | Sun et al. | |
| 2018/0030180 A1 | 2/2018 | Sung et al. | |
| 2018/0194883 A1 | 7/2018 | Kim et al. | |
| 2019/0127503 A1 | 5/2019 | Joung et al. | |

FOREIGN PATENT DOCUMENTS

| | | |
|---|---|---|
| CN | 106232638 A | 12/2016 |
| CN | 106661160 A | 5/2017 |
| CN | 106674400 A | 5/2017 |
| CN | 107207661 A | 9/2017 |
| EP | 1417260 A1 | 5/2004 |
| EP | 3056524 A1 | 8/2016 |
| EP | 3070108 A1 | 9/2016 |
| JP | 2017530201 A | 10/2017 |
| JP | 2017536422 A | 12/2017 |
| JP | 2019515097 A | 6/2019 |
| KR | 20000048466 A | 7/2000 |
| KR | 20030036840 A | 5/2003 |
| KR | 20040004455 A | 1/2004 |
| KR | 20060128844 A | 12/2006 |
| KR | 20070098276 A | 10/2007 |
| KR | 20080097949 A | 11/2008 |
| KR | 100964093 B1 | 6/2010 |
| KR | 20120076156 A | 7/2012 |
| KR | 20130046408 A | 5/2013 |
| KR | 20160043516 A | 4/2016 |
| KR | 20160084181 A | 7/2016 |
| KR | 20170055149 A | 5/2017 |
| KR | 20170076550 A | 7/2017 |
| KR | 20170106110 A | 9/2017 |
| RU | 2465291 C2 | 10/2012 |
| WO | 03016396 A1 | 2/2003 |
| WO | 2015123172 A1 | 8/2015 |
| WO | 2016036221 A1 | 3/2016 |

OTHER PUBLICATIONS

International Search Report for PCT/KR2018/016503 dated Apr. 5, 2019; 2 pages.

Search Report dated May 25, 2022 from the Office Action for Chinese Application No. 201880082578.2 dated Jun. 2, 2022, 3 pages.

Shimian, C. et al., "Studies on Copolymerization of Ethylene and 1-Butene Using Supported Catalysts from MgRR," Petrochemical Technology, Dec. 1994, pp. 776-782, No. 23, vol. 12. [Providing English Translation of Abstract only].

ETHYLENE/1-BUTENE COPOLYMER HAVING EXCELLENT PROCESSABILITY

CROSS-REFERENCE TO RELATED APPLICATIONS

This application is a national phase entry under 35 U.S.C. § 371 of International Application No. PCT/KR2019/016503 filed Dec. 21, 2018, which claims priority from Korean Patent Application No. 10-2017-0177534 filed Dec. 21, 2017, and Korean Patent Application No. 10-2018-0166741 filed Dec. 20, 2018, all of which are incorporated herein by reference.

BACKGROUND OF THE INVENTION (a) Field of the Invention

The present invention relates to an ethylene/1-butene copolymer having excellent processability.

(b) Description of the Related Art

Polyolefin resins used for large-diameter high-pressure pipe tubes generally require high pressure resistance characteristic and excellent processability. The high pressure resistance characteristic is a physical property that is generally expressed in a high density region, and this is because the higher the degree of crystallization in the polyolefin resin, the modulus increases and the strength to withstand a high pressure increases. However, pipes generally have to assure a long-term pressure resistance stability for at least 50 years, but there is a disadvantage that, if the density is high, the resistance against the brittle fracture mode is deteriorated and the long-term pressure resistance characteristic is deteriorated. In addition, when a molecular weight is low or a molecular weight distribution is narrow, a sagging phenomenon (melt sagging phenomenon) occurs during processing of a large diameter pipe and it is difficult to process the pipe. A polyolefin resin having a high molecular weight and a very broad molecular weight distribution should be applied to solve these problems. Especially, if the molecular weight is high, an extrusion load is largely generated and pipe appearance becomes poor, and thus a very wide molecular weight distribution is necessarily required.

Many attempts have been conducted to improve these problems, and for example, Korean Patent Application Nos. 2003-7007276, 1999-0064650, 2006-7005524, and 2003-7004360 describe a bimodal polyethylene resin for blow-molding applications, etc., a composition including the bimodal polyethylene resin, or a catalyst for the preparation thereof, etc. However, there is a problem in that physical properties and processability of the product are not satisfied at the same time.

Under this background, there is a continuous demand for the production of more excellent products with a balance between physical properties and processability, in particular, further improvement of stress cracking resistance.

SUMMARY OF THE INVENTION

To solve the problems of the prior art, the present invention provides an ethylene/1-butene copolymer having excellent processability and excellent stress cracking resistance.

To achieve the above object, the present invention provides an ethylene/1-butene copolymer having a melt flow rate ratio ($MFR_{21.6}/MFR_{2.16}$) value of 30 to 60, as measured at 190° C. in accordance with ASTM1238, a molecular weight distribution (Mw/Mn, PDI) of 8 to 20, a BOCD (Broad Orthogonal Co-monomer Distribution) index of 1 to 2, and stress cracking resistance of 1,000 hr to 20,000 hr, as measured by a full notch creep test (FNCT) in accordance with ISO 16770 at 4.0 MPa and 80° C.

The ethylene/1-butene copolymer according to the present invention has a narrow molecular weight distribution to have improved processability and excellent stress cracking resistance, thereby being applied to a high-pressure resistant heating pipe, a PE-RT pipe, a large diameter pipe, etc.

DETAILED DESCRIPTION OF THE EMBODIMENTS

Figure 1:
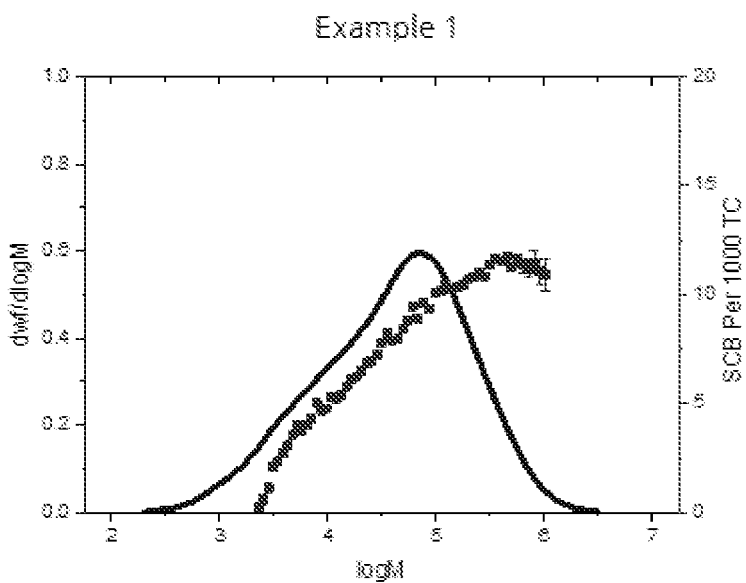
FIG. 1 shows a GPC curve of a copolymer prepared in one Example of the present invention.

In the present invention, the terms "the first", "the second", and the like are used to describe a variety of components, and these terms are merely employed to differentiate a certain component from other components.

Further, the terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, numbers, steps, components, or combinations thereof, and do not exclude the existence or the possibility of addition of one or more different characteristics, numbers, steps, components or combinations thereof beforehand.

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

Hereinafter, the present invention will be described in detail.

An ethylene/1-butene copolymer according to one embodiment of the present invention is characterized by having a melt flow rate ratio (MFRR, $MFR_{21.6}/MFR_{2.16}$) of 30 to 60, as measured at 190° C. in accordance with ASTM1238, a molecular weight distribution (Mw/Mn, PDI) of 8 to 20, a BOCD (Broad Orthogonal Co-monomer Distribution) index of 1 to 2, and stress cracking resistance of 1,000 hr to 20,000 hr, as measured by a full notch creep test (FNCT) in accordance with ISO 16770 at 4.0 MPa and 80° C.

A high-pressure resistant heating pipe or a PE-RT pipe requires basic mechanical properties and high pressure resistance characteristic and excellent processability. To secure processability, there is a method of preparing a polyolefin having a wide molecular weight distribution by copolymerizing a comonomer having 6 or more carbon atoms such as 1-hexene and 1-octene. However, there are disadvantages in that it is difficult to control the molecular weight distribution of 1-hexene or 1-octene, and 1-hexene or 1-octene is expensive to increase the production cost. Thus, studies on a method of using 1-butene as a comonomer has been continued.

However, when a copolymer is prepared using 1-butene as a comonomer, it is required to have a wider molecular weight distribution than those prepared using 1-hexene or 1-octene, in order to meet physical properties of the full notch creep test (FNCT), and as a result, there is a problem that processability deteriorates.

To simultaneously meet high processability and stress cracking resistance at a level suitable for a high-pressure resistant heating pipe, a PE-RT pipe, etc., it is required to increase an extrusion amount of a resin by narrowing the molecular weight distribution, to increase the comonomer content in the high molecular weight region, to exhibit a high melt flow rate ratio, etc. It is not easy to meet all these conditions by using 1-butene as a comonomer.

Accordingly, the present invention may provide an ethylene/1-butene copolymer showing a narrow molecular weight distribution, as compared with the existing ethylene/1-butene copolymer, to have excellent stress cracking resistance while having a BOCD structure, in which the content of SCB (Short Chain Branch) is high in the high molecular weight region, and having a high melt flow rate ratio to exhibit excellent processability and extrusion characteristics by using a hybrid supported metallocene catalyst including two kinds of metallocene compounds showing low comonomer incorporation in the low molecular weight region and high comonomer incorporation in the high molecular weight region with respect to 1-butene.

According to one embodiment of the present invention, the ethylene/1-butene copolymer has a melt flow rate ratio (MFRR, $MFR_{21.6}/MFR_{2.16}$) of 30 to 60, as measured at 190° C. in accordance with ASTM1238. More preferably, the melt flow rate ratio is 30 or more, 31 or more, 33 or more, or 35 or more, and 60 or less, 55 or less, 50 or less, or 45 or less. When the ethylene/1-butene copolymer has the melt flow rate ratio within the above range, flowability under each load may be appropriately controlled, thereby improving processability and mechanical properties at the same time.

Further, according to one embodiment of the present invention, the ethylene/1-butene copolymer has a molecular weight distribution (Mw/Mn, PDI) of 8 to 20. More preferably, the molecular weight distribution is 9 or more, or 9.5 or more, 10 or more, 10.1 or more, 10.5 or more, or 11 or more, and 20 or less, 15 or less, 14 or less, 13 or less, or 12 or less. According to the molecular weight distribution, the ethylene/1-butene copolymer may exhibit excellent processability.

According to one embodiment of the present invention, the ethylene/1-butene copolymer has a BOCD index of 1 to 2. More preferably, the BOCD Index may be 1 or more, 1.1 or more, or 1.2 or more, and 2 or less, 1.9 or less, or 1.7 or less.

As described, the ethylene/1-butene copolymer of the present invention has the high BOCD Index, thereby exhibiting excellent stress cracking resistance.

As used herein, the BOCD structure refers to a structure in which the content of a comonomer such as alpha-olefin is concentrated at a high molecular weight main chain, i.e., a structure in which the content of a short chain branch (SCB) increases toward the higher molecular weight side.

The molecular weight, molecular weight distribution, and SCB content may be measured at the same time by GPC-FTIR instrument, and the BOCD index may be calculated based on the following Equation 1 by obtaining a molecular weight distribution curve by plotting a log value (log M) of a molecular weight (M) on the x-axis, and a molecular weight distribution (dwt/dlog M) with respect to the log value on the y-axis, and then measuring the SCB (Short Chain Branch) content (content of branches having 2 to 7 carbon atoms per 1,000 carbons, unit: branch/1,000 C) at the left and right borders of centered 60% area excluding 20% of the left and right ends in the total area. In this regard, the SCB content at a high molecular weight side and the SCB content at a low molecular weight side mean SCB content values at the left and right borders of centered 60% area, excluding 20% of the left and right ends, respectively.

BOCD Index=SCB content at high molecular weight side−SCB content at low molecular weight side/ SCB content at low molecular weight side  [Equation 1]

When the BOCD index is 0 or less, the polymer has no BOCD structure, and when BOCD index is more than 0, the polymer has the BOCD structure. As the polymer has a higher value, it may be evaluated as having excellent BOCD characteristics.

Further, according to one embodiment of the present invention, the ethylene/1-butene copolymer may have the SCB (Short Chain Branch) content (content of branches having 2 to 7 carbon atoms per 1,000 carbons, unit: branch/1,000 C) of 5 or more, 6 or more, 7 or more, or 8 or more, and 20 or less, 18 or less, 16 or less, 14 or less, or 12 or less.

As described, the ethylene/1-butene copolymer of the present invention may have a narrow molecular weight distribution (PDI) and a high BOCD index, as compared with the known ethylene/1-butene copolymer, thereby exhibiting excellent processability and stress cracking resistance.

Further, the ethylene/1-butene copolymer has stress cracking resistance (unit: hr) of 1,000 hr to 20,000 hr, as measured by a full notch creep test (FNCT) in accordance with ISO 16770 at 4.0 MPa and 80° C. More preferably, the stress cracking resistance is 1,000 hr or more, 1,200 hr or more, 1,300 hr or more, 1,600 hr or more, 1,700 hr or more, or 2,000 hr or more. Further, the higher stress cracking resistance value indicates more excellent physical properties. Therefore, there is no practical limitation in the upper limit thereof, but the stress cracking resistance may be, for example, 20,000 hr or less, 10,000 hr or less, 7,000 hr or less, 6,000 hr or less, 5,000 hr or less, 4,000 hr or less, or 3,000 hr or less.

Further, the ethylene/1-butene copolymer has a tensile strain hardening value of 0.94 to 1.00, which is a long-term physical property, as measured by a tensile test at 80° C. More preferably, the tensile strain hardening value is 0.94 or more, or 0.95 or more. Further, the higher tensile strain hardening value indicates more excellent physical properties. Therefore, there is no practical limitation in the upper limit thereof, but the tensile strain hardening value may be, for example, 2.0 or less, 1.5 or less, or 1.2 or less. A method of measuring the tensile strain hardening value will be explained in more detail in Examples below.

According to one embodiment of the present invention, the ethylene/1-butene copolymer may have a melt flow rate ($MFR_{2.16}$) of about 0.1 g/10 min or more, about 0.3 g/10 min or more, about 0.5 g/10 min or more, and about 3 g/10 min or less, about 2 g/10 min or less, about 1 g/10 min or less, or about 0.6 g/10 min or less, as measured at 190° C. under a load of 2.16 kg in accordance with ASTM D1238.

Further, according to one embodiment of the present invention, the ethylene/1-butene copolymer may have a melt flow rate ($MFR_{21.6}$) of about 10 g/10 min or more, about 12 g/10 min or more, about 14 g/10 min or more, or about 15 g/10 min or more, and about 40 g/10 min or less, about 30 g/10 min or less, about 28 g/10 min or less, or about 25 g/10 min or less, as measured at 190° C. under a load of 21.6 kg in accordance with ASTM D1238.

The ranges of $MFR_{2.16}$ and $MFR_{21.6}$ may be appropriately controlled in consideration of use or application fields of the ethylene/1-butene copolymer.

Further, according to one embodiment of the present invention, the ethylene/1-butene copolymer may have a density of 0.930 g/cm$^2$ to 0.950 g/cm$^2$, and preferably 0.934 g/cm$^2$ to 0.940 g/cm$^2$.

According to one embodiment of the present invention, the ethylene/1-butene copolymer may have a weight average molecular weight (Mw) of 10,000 g/mol to 400,000 g/mol. More preferably, the weight average molecular weight may be 50,000 g/mol or more, 60,000 g/mol or more, 70,000 g/mol or more, 80,000 g/mol or more, 90,000 g/mol or more, 100,000 g/mol or more, 110,000 g/mol or more, or 120,000 g/mol or more, and 350,000 g/mol or less, 300,000 g/mol or less, 250,000 g/mol or less, 200,000 g/mol or less, or 150,000 g/mol or less.

In the ethylene/1-butene copolymer, the content of the 1-butene comonomer may be about 0.5% by weight to about 10% by weight, preferably about 1% by weight to about 5% by weight, but is not limited thereto.

As described, the ethylene/1-butene copolymer may be prepared using a hybrid supported metallocene catalyst.

The hybrid supported metallocene catalyst may be a hybrid supported metallocene catalyst including one or more of a first metallocene compound represented by the following Chemical Formula 1; one or more of a second metallocene compound represented by the following Chemical Formula 2; a cocatalyst compound; and a carrier:

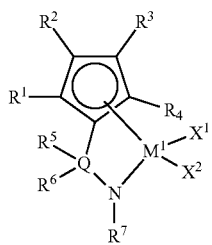

[Chemical Formula 1]

in Chemical Formula 1,
$M^1$ is a Group 4 transition metal,
$R^1$ to $R^7$ are, the same as or different from each other, each independently a functional group selected from the group consisting of hydrogen, an alkyl group having 1 to 20 carbon atoms, an alkoxy group having 1 to 20 carbon atoms, an alkenyl group having 2 to 20 carbon atoms, an alkylalkoxy group having 2 to 20 carbon atoms, an alkoxyalkyl group having 2 to 20 carbon atoms, an aryl group having 6 to 20 carbon atoms, an alkylaryl group having 7 to 20 carbon atoms, and an arylalkyl group having 7 to 20 carbon atoms, wherein two or more adjacent groups may be connected to each other to form an aliphatic or aromatic ring unsubstituted or substituted with a hydrocarbyl group having 1 to 10 carbon atoms, $X^1$ and $X^2$ are, the same as or different from each other, each independently halogen or an alkyl group having 1 to 20 carbon atoms;

Q is carbon, germanium, or silicon,
N is nitrogen,

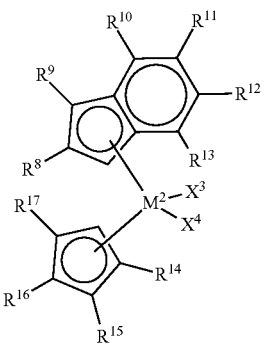

[Chemical Formula 2]

in Chemical Formula 2,
$M^2$ is a Group 4 transition metal,
any one or more of $R^8$ to $R^{13}$ are —(CH$_2$)n-OR (wherein R is a linear or branched alkyl group having 1 to 6 carbon atoms, and n is an integer of 2 to 10.), and the rest if present are, the same as or different from each other, each independently hydrogen, an alkyl group having 1 to 20 carbon atoms, an alkenyl group having 2 to 20 carbon atoms, an aryl group having 6 to 20 carbon atoms, an alkylaryl group having 7 to 20 carbon atoms, or an arylalkyl group having 7 to 20 carbon atoms, $R^{14}$ to $R^{17}$ are each independently hydrogen or an alkyl group having 1 to 20 carbon atoms, and $X^3$ and $X^4$ are, the same as or different from each other, each independently halogen, or an alkyl group having 1 to 20 carbon atoms.

Substituents of Chemical Formulae 1 and 2 are described in more detail as follows.

The alkyl group having 1 to 20 carbon atoms may include a linear or branched alkyl group, and specifically, it may be exemplified by a methyl group, an ethyl group, a propyl group, an isopropyl group, an n-butyl group, a tert-butyl group, a pentyl group, a hexyl group, a heptyl group, an octyl group or the like, but is not limited thereto.

The alkenyl group having 2 to 20 carbon atoms may include a linear or branched alkenyl group, and specifically, it may be exemplified by an allyl group, an ethenyl group, a propenyl group, a butenyl group, a pentenyl group or the like, but is not limited thereto.

The aryl group having 6 to 20 carbon atoms may include a single ring or condensed ring aryl group, and specifically, it may be exemplified by a phenyl group, a biphenyl group, a naphthyl group, a phenanthrenyl group, a fluorenyl group or the like, but is not limited thereto.

The alkoxy group having 1 to 20 carbon atoms may include a methoxy group, an ethoxy group, a phenyloxy group, a cyclohexyloxy group or the like, but is not limited thereto.

The Group 4 transition metal may include titanium, zirconium, hafnium or the like, but is not limited thereto.

In the hybrid supported metallocene catalyst according to one embodiment of the present invention, the first metallocene compound represented by Chemical Formula 1 may mainly contribute to preparation of a low-molecular-weight copolymer having a low SCB (short chain branch) content, and the second metallocene compound represented by Chemical Formula 2 may mainly contribute to a high-molecular-weight ethylene/1-butene copolymer having a high SCB (short chain branch) content.

More specifically, when the first metallocene compound of Chemical Formula 1 and the second metallocene compound of Chemical Formula 2 together with another metallocene compound are used as a hybrid supported metallocene catalyst, a copolymer in a high molecular weight region may exhibit high comonomer incorporation with respect to 1-butene by the second metallocene compound, and a copolymer in a low molecular weight region may exhibit low comonomer incorporation with respect to 1-butene by action of the metallocene compound of Chemical Formula 1.

Therefore, it is very advantageous to polymerize an ethylene/1-butene copolymer having a structure in which the content of 1-butene comonomer is concentrated in a high molecular weight main chain, that is, a BOCD (Broad Orthogonal Co-monomer Distribution) structure in which the content of the side chain increases toward the higher molecular weight side.

In Chemical Formula 1, $M^1$ may be titanium.

$X^1$ and $X^2$ may be preferably halogen, and more preferably Cl.

$R^1$ to $R^5$ may be preferably an alkyl group having 1 to 20 carbon atoms, and more preferably a methyl group.

$R^6$ may be preferably an alkoxyalkyl group having 2 to 20 carbon atoms, or an alkyl group having 1 to 20 carbon atoms, and more preferably a methyl group or a tert-butoxy hexyl group.

$R^7$ may be preferably an alkyl group having 1 to 20 carbon atoms, and more preferably a tert-butyl group.

The compound represented by Chemical Formula 1 may be, for example, a compound represented by the following structural formula, but is not limited thereto:

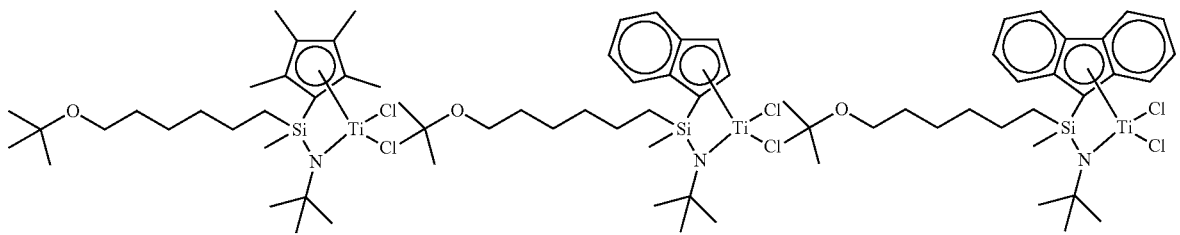

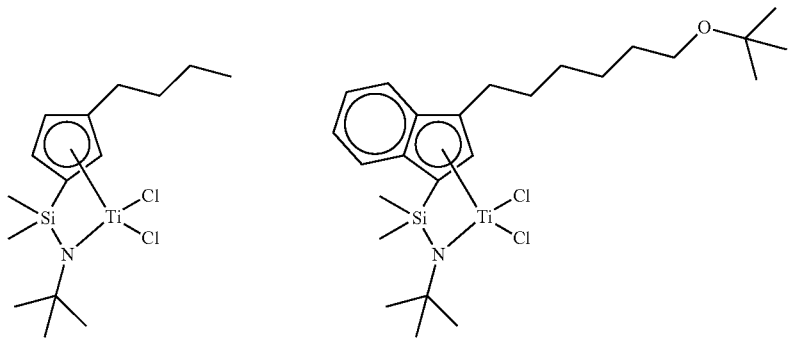

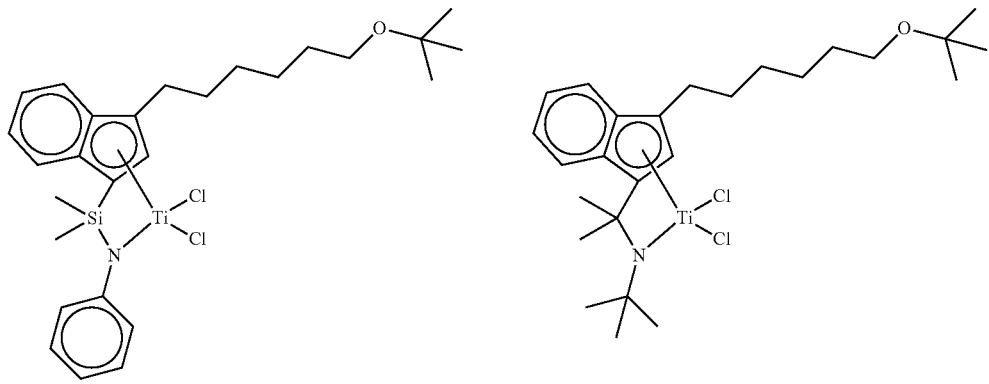

-continued

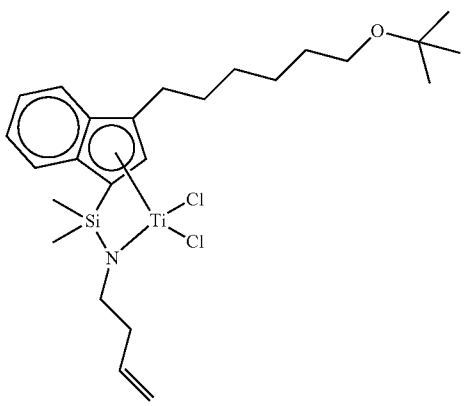

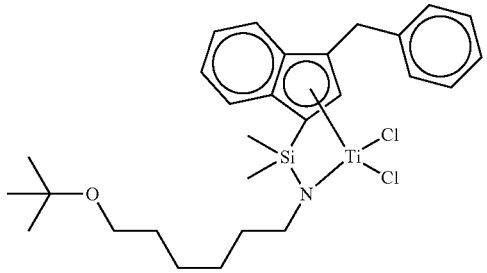

The second metallocene compound of Chemical Formula 2 has a structure in which an indene group and a cyclopentadiene (Cp) are uncrosslinked. In this regard, a substituent of —(CH$_2$)n-OR (wherein R is a linear or branched alkyl group having 1 to 6 carbon atoms, and n is an integer of 2 to 10) is introduced into at least one substituent of the cyclopentadiene and indene groups. Therefore, the catalyst may exhibit a low conversion rate with respect to 1-butene comonomer during preparation of the ethylene/1-butene copolymer by using 1-butene comonomer, as compared with other Cp-based catalysts not including the above substituent, thereby preparing an ethylene/1-butene copolymer having a low to medium molecular weight, in which the 1-butene comonomer distribution is controlled.

In Chemical Formula 2, M$^2$ may be zirconium.

X$^3$ and X$^4$ may be preferably halogen, and more preferably Cl.

In the second metallocene compound of one embodiment, any one or more of R$^8$ to R$^{13}$ in Chemical Formula 2 is —(CH$_2$)n-OR (wherein R is a linear or branched alkyl group having 1 to 6 carbon atoms, and n is an integer of 2 to 10).

In Chemical Formula 2, —(CH$_2$)n-OR may be preferably tert-butoxy hexyl. When a metallocene compound having such a structure is supported onto a carrier, the —(CH$_2$)n-OR group substituted in the indene group of the substituents may form a covalent bond through close interaction with a silanol group on the surface of silica used as the carrier, and therefore, stable supporting polymerization is possible. Further, the functional group may influence comonomer incorporation of 1-butene comonomer. Thus, since the catalyst has lowered comonomer incorporation with respect to 1-butene comonomer while maintaining the total polymerization activity, it is advantageous in the production of an ethylene/1-butene copolymer, of which copolymerization degree is controlled, without lowering other physical properties.

Specific examples of the second metallocene compound represented by Chemical Formula 2 may include compounds represented by the following structural formulae, but the present invention is not limited thereto:

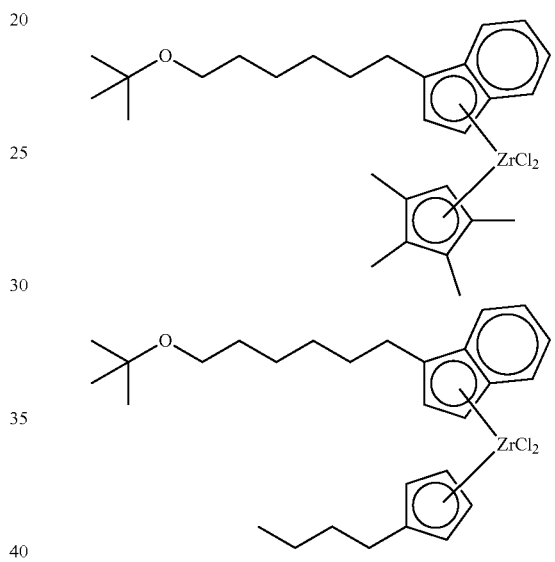

The second metallocene compound represented by Chemical Formula 2 may be synthesized by applying the known reactions, and a more detailed synthesis method may be performed by referring to Examples.

When a hybrid supported metallocene catalyst including both the metallocene compound having high comonomer incorporation and the metallocene compound having low comonomer incorporation may be used as the hybrid supported catalyst according to one embodiment of the present invention, an ethylene/1-butene copolymer in a high molecular weight region may exhibit high comonomer incorporation with respect to 1-butene by the second metallocene compound, and an ethylene/1-butene copolymer in a low molecular weight region may exhibit low comonomer incorporation with respect to 1-butene by action of the first metallocene compound.

As a result, it is very advantageous to polymerize the above-described ethylene/1-butene copolymer of the present invention having a structure in which the content of 1-butene comonomer is concentrated in a high molecular weight main chain, that is, a BOCD structure in which the content of the side chain increases toward the higher molecular weight side, and having a narrower molecular weight distribution than the existing ethylene/1-butene copolymer.

The hybrid supported metallocene catalyst used in the present invention may be a catalyst prepared by supporting one or more of the first metallocene compound represented by Chemical Formula 1 and one or more of the second metallocene compound represented by Chemical Formula 2, together with a cocatalyst compound, onto carrier.

In the hybrid supported metallocene catalyst according to the present invention, the cocatalyst supported on the carrier in order to activate the metallocene compound may be an organometallic compound containing a Group 13 metal, and any cocatalyst may be used without particular limitation as long as it may be used in the polymerization of olefin in the presence of a common metallocene catalyst.

Specifically, the cocatalyst compound may include one or more of an aluminum-containing first cocatalyst of the following Chemical Formula 3 and a borate-based second cocatalyst of the following Chemical Formula 4:

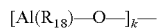 [Chemical Formula 3]

in Chemical Formula 3, $R_{18}$ is each independently halogen, a hydrocarbyl group having 1 to 20 carbon atoms substituted or unsubstituted with halogen, and k is an integer of 2 or more,

 [Chemical Formula 4]

in Chemical Formula 4, $T^+$ is a +1 valent polyatomic ion, B is boron in an oxidation state of +3, and G is each independently selected from the group consisting of a hydride group, a dialkylamido group, a halide group, an alkoxide group, an aryloxide group, a hydrocarbyl group, a halocarbyl group, and a halo-substituted hydrocarbyl group, wherein G has 20 or less carbon atoms, provided that G is a halide group at one or less position.

By using the above first and second cocatalysts, the polymerization activity may be further enhanced.

The first cocatalyst of Chemical Formula 3 may be an alkylaluminoxane-based compound, in which repeating units are combined into a linear, circular, or network structure. Specific examples of the first cocatalyst may include methylaluminoxane (MAO), ethylaluminoxane, isobutylaluminoxane, butylaluminoxane or the like.

Further, the second cocatalyst of Chemical Formula 4 may be a borate-based compound in the form of a trisubstituted ammonium salt, a dialkyl ammonium salt, or a trisubstituted phosphonium salt. Specific examples of the second cocatalyst may include a borate-based compound in the form of a trisubstituted ammonium salt such as trimethylammonium tetraphenylborate, methyldioctadecylammonium tetraphenylborate, triethylammonium tetraphenylborate, tripropylammonium tetraphenylborate, tri(n-butyl) ammonium tetraphenylborate, methyltetradecyclooctadecylammonium tetraphenylborate, N,N-dimethylanilium tetraphenylborate, N,N-diethylanilium tetraphenylborate, N,N-dimethyl(2,4,6-trimethylanilium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl) borate, triethylammonium tetrakis(pentafluorophenyl)borate, tripropylammoniumtetrakis(pentafluorophenyl)borate, tri(n-butyl)ammonium tetrakis(pentafluorophenyl)borate, tri(secondary-butyl)ammoniumtetrakis(pentafluorophenyl)borate, N,N-dimethylanilium tetrakis(pentafluorophenyl)borate, N,N-diethylaniliumtetrakis(pentafluorophenyl)borate, N,N-dimethyl(2,4,6-trimethylanilium) tetrakis(pentafluorophenyl)borate, trimethylammoniumtetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl) ammonium tetrakis(2,3,4,6-tetrafluorophenyl)borate, dimethyl(t-butyl)ammonium tetrakis(2,3,4,6-tetrafluorophenyl)borate, N,N-dimethylanilium tetrakis(2,3,4,6-tetrafluorophenyl)borate, N,N-diethylanilium tetrakis(2,3,4,6-tetrafluorophenyl)borate, or N,N-dimethyl-(2,4,6-trimethylanilium)tetrakis-(2,3,4,6-tetrafluorophenyl)borate or the like; a borate-based compound in the form of a dialkylammonium salt such as dioctadecylammonium tetrakis(pentafluorophenyl)borate, ditetradecylammonium tetrakis(pentafluorophenyl)borate, dicyclohexylammonium tetrakis(pentafluorophenyl)borate or the like; or a borate-based compound in the form of a trisubstituted phosphonium salt such as triphenylphosphonium tetrakis(pentafluorophenyl)borate, methyldioctadecylphosphonium tetrakis(pentafluorophenyl)borate, tri(2,6-dimethylphenyl)phosphonium tetrakis(pentafluorophenyl)borate or the like.

In the hybrid supported metallocene catalyst according to the present invention, a weight ratio of the total transition metals included in the first metallocene compound represented by Chemical Formula 1 or the second metallocene compounds represented by Chemical Formula 2 to the carrier may be 1:10 to 1:1,000. When the carrier and the metallocene compound are included in the above weight ratio, the optimum shape may be provided. Further, a weight ratio of the cocatalyst compound to the carrier may be 1:1 to 1:100.

In the supported metallocene catalyst according to the present invention, a carrier containing a hydroxyl group on its surface may be used as the carrier, and preferably, a carrier containing a highly reactive hydroxyl group or siloxane group, of which the surface is dried and removed of moisture, may be used.

For example, silica, silica-alumina, and silica-magnesia dried at a high temperature may be used. These carriers may include oxides, carbonates, sulfates, and nitrate components such as $Na_2O$, $K_2CO_3$, $BaSO_4$, $Mg(NO_3)_2$, etc.

The drying temperature of the carrier is preferably 200° C. to 800° C., more preferably at 300° C. to 600° C., and most preferably at 300° C. to 400° C. If the drying temperature of the carrier is lower than 200° C., it retains too much moisture so that moisture on the surface reacts with the cocatalyst. If the drying temperature is higher than 800° C., pores on the surface of the carrier are combined with each other to reduce surface area, and many hydroxyl groups are lost on the surface to remain only siloxane groups. Thus, the reactive sites with the cocatalyst are reduced, which is not preferable.

The amount of hydroxyl group on the surface of the carrier is preferably 0.1 mmol/g to 10 mmol/g, and more preferably 0.5 mmol/g to 5 mmol/g. The amount of hydroxyl group on the surface of the carrier may be controlled depending on the preparation method and conditions of the carrier, or drying conditions, for example, temperature, time, vacuum, spray drying or the like.

If the amount of hydroxyl group is less than 0.1 mmol/g, the reactive sites with the cocatalyst are reduced. If the amount of hydroxyl group is more than 10 mmol/g, it may be caused by moisture besides the hydroxyl groups present on the surface of carrier particles, which is not preferable.

Meanwhile, the ethylene/1-butene copolymer according to the present invention may be prepared by polymerizing ethylene and 1-butene in the presence of the above-described hybrid supported metallocene catalyst.

The polymerization may be performed by copolymerizing ethylene, and 1-butene using one continuous slurry polymerization reactor, loop slurry reactor, gas phase reactor, or solution reactor.

Further, the polymerization temperature may be about 25° C. to about 500° C., preferably about 25° C. to about 200° C., more preferably about 50° C. to about 150° C. Further, the polymerization pressure may be about 1 kgf/cm$^2$ to about 100 kgf/cm$^2$, preferably about 1 kgf/cm$^2$ to about 50 kgf/cm$^2$, more preferably about 5 kgf/cm$^2$ to about 30 kgf/cm$^2$.

The hybrid supported metallocene catalyst may be injected after being dissolved or diluted in an aliphatic hydrocarbon solvent having 5 to 12 carbon atoms, for example, pentane, hexane, heptane, nonane, decane, and isomers thereof, an aromatic hydrocarbon solvent such as toluene and benzene, a chlorine-substituted hydrocarbon solvent such as dichloromethane and chlorobenzene, etc. The solvent used herein may be preferably treated with a trace amount of alkyl aluminum to remove catalytic poisons such as water, air, etc. The polymerization may be also performed by further using the cocatalyst.

As described, the ethylene/1-butene copolymer according to the present invention may be prepared by copolymerizing ethylene and 1-butene comonomers using the above-described hybrid supported metallocene catalyst. Due to the interaction of the two or more kinds of metallocene catalysts in the hybrid supported metallocene catalyst, it is possible to obtain an ethylene/1-butene copolymer having an overall narrow molecular weight distribution while including a higher content of SCB in the high molecular weight region.

Figure 2:
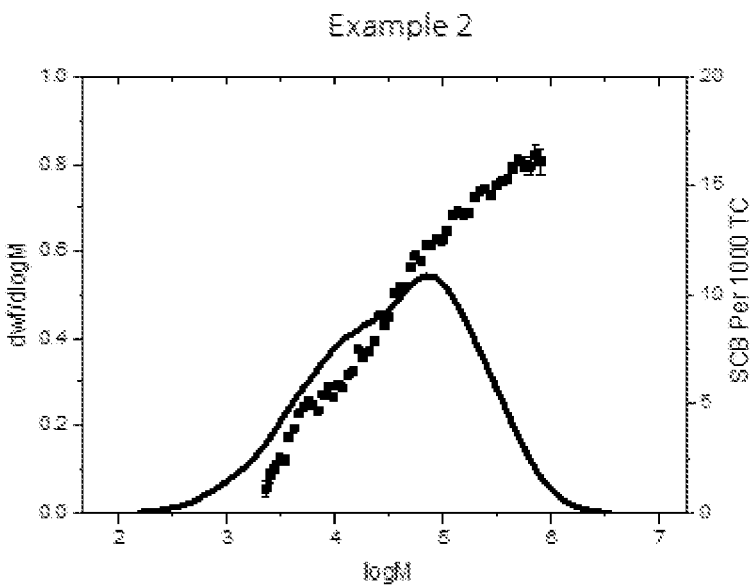
FIG. 2 shows a GPC curve of a copolymer prepared in one Example of the present invention.
Figure 3:
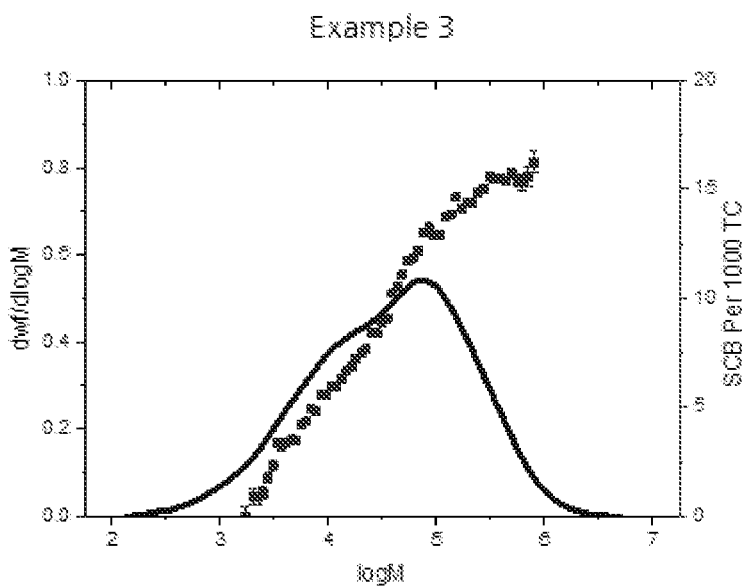
FIG. 3 shows a GPC curve of a copolymer prepared in one Example of the present invention.
Figure 4:
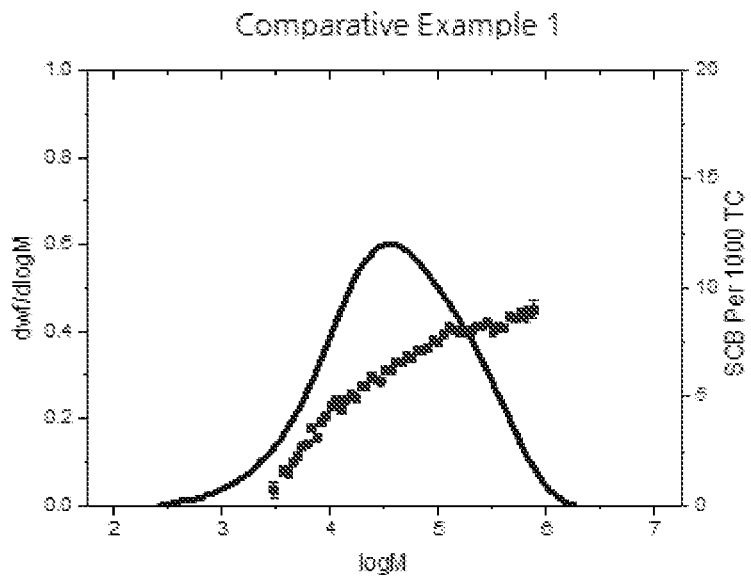
FIG. 4 shows a GPC curve of a copolymer prepared in one Comparative Example of the present invention.
Figure 5:
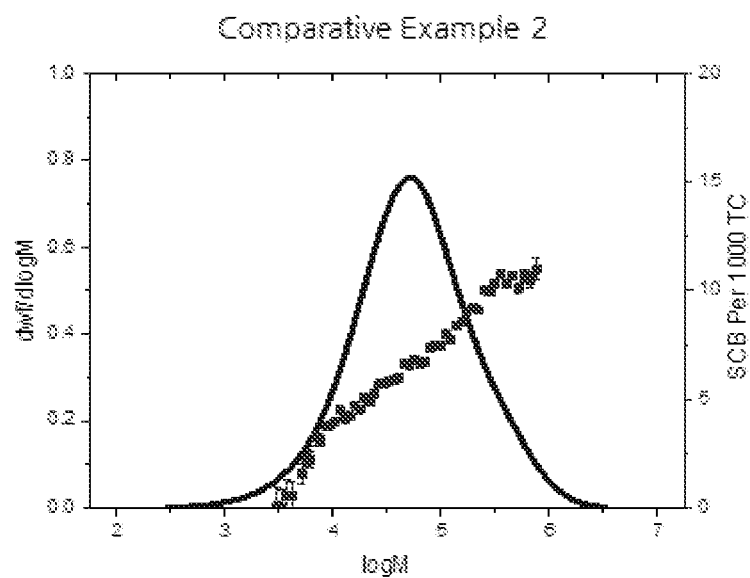
FIG. 5 shows a GPC curve of a copolymer prepared in one Comparative Example of the present invention.
Figure 6:
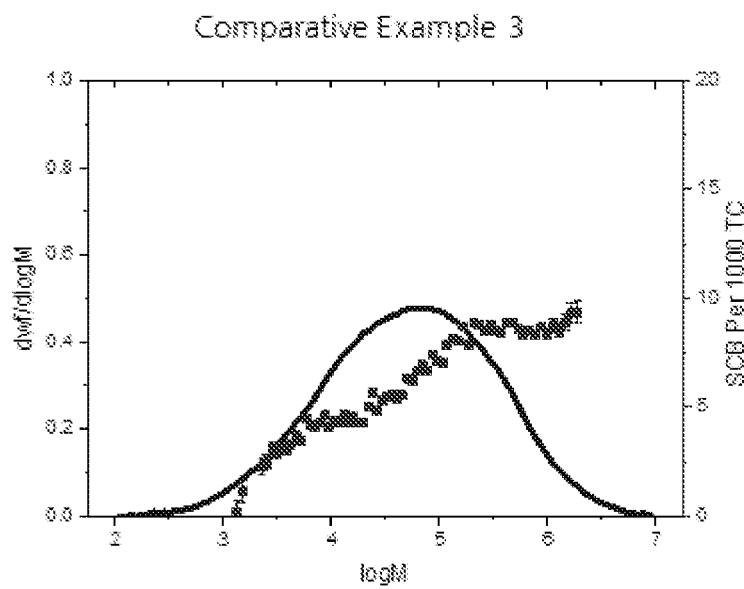
FIG. 6 shows a GPC curve of a copolymer prepared in one Comparative Example of the present invention.
Figure 7:
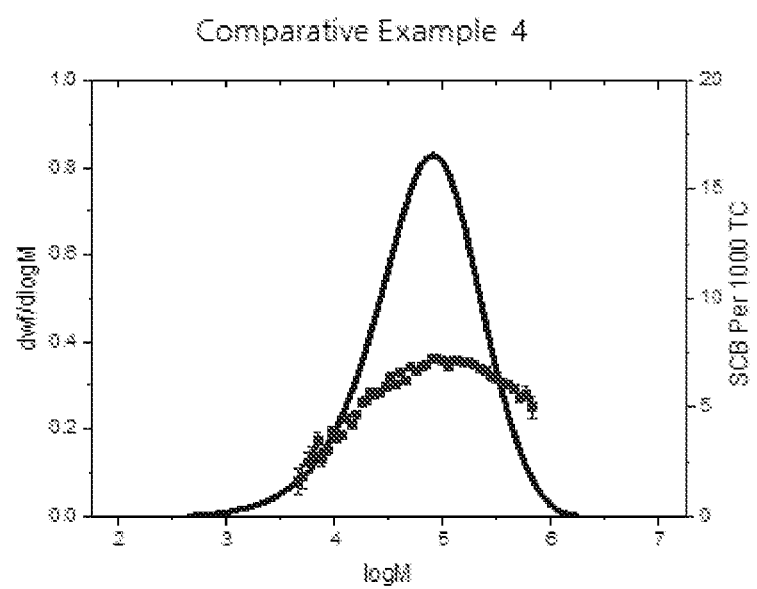
FIG. 7 shows a GPC curve of a copolymer prepared in one Comparative Example of the present invention.

As a result, the ethylene/1-butene copolymer may exhibit, for example, a GPC molecular weight distribution curve as illustrated in FIGS. 1 to 3, and may exhibit excellent stress cracking resistance due to a narrow molecular weight distribution and excellent processability due to the high content of SCB in the high molecular weight region. By meeting the above physical properties, the ethylene/1-butene copolymer according to the present invention may exhibit excellent processability and extrusion characteristics, and excellent stress cracking resistance, thereby being preferably applied to a high-pressure resistant heating pipe, a PE-RT pipe, a large diameter pipe, etc.

Hereinafter, preferred examples will be provided for better understanding of the present invention. However, the following examples are provided only for more easily understanding the present invention, and the present invention is not limited thereby.

EXAMPLE

Preparation Example of First Metallocene Compound

Synthesis Example 1

Preparation of [(tBu-O—(CH$_2$)$_6$)(CH$_3$)Si(C$_5$(CH$_3$)$_4$)(tBu-N)TiCl$_2$]

50 g of Mg(s) was put in a 10 L reactor at room temperature, and then 300 mL of THF was added thereto. After adding about 0.5 g of I$_2$, the reactor temperature was maintained at 50° C. After the reactor temperature was stabilized, 250 g of 6-t-butoxyhexyl chloride was added to the reactor at a rate of 5 mL/min using a feeding pump. According to the addition of 6-t-butoxyhexyl chloride, it was observed that the reactor temperature was increased by about 4° C. to 5° C. 6-t-butoxyhexyl chloride was continuously added under stirring for 12 hr. 12 hr after reaction, a black reaction solution was obtained. After 2 mL of the produced black solution was sampled, water was added thereto to obtain an organic layer. Thus, 6-t-butoxyhexane was identified by 1H-NMR. 6-t-butoxyhexane indicated that the Grignard reaction was well performed. Accordingly, 6-t-butoxyhexyl magnesium chloride was synthesized.

After 500 g of MeSiCl$_3$ and 1 L of THF were added to the reactor, the reactor temperature was cooled to –20° C. 560 g of the synthesized 6-t-butoxyhexyl magnesium chloride was added to the reactor using a feeding pump at a rate of 5 mL/min. After feeding of the Grignard reagent was finished, the reactor temperature was slowly increased to room temperature, followed by stirring for 12 hr. 12 hr after reaction, it was confirmed that white MgCl$_2$ salt was generated. 4 L of hexane was added and the salt was removed through labdori to obtain a filtrate. After the resulting filtrate was added to the reactor, hexane was removed at 70° C. to obtain a light yellow liquid. It was confirmed by 1H-NMR that the obtained liquid was a desired methyl(6-t-butoxyhexyl)dichlorosilane compound.

$^1$H-NMR (CDCl$_3$): 3.3 (t, 2H), 1.5 (m, 3H), 1.3 (m, 5H), 1.2 (s, 9H), 1.1 (m, 2H), 0.7 (s, 3H)

After 1.2 mol (150 g) of tetramethylcyclopentadiene and 2.4 L of THF were added to the reactor, the reactor temperature was cooled to –20° C. 480 mL of n-BuLi was added to the reactor using the feeding pump at a rate of 5 mL/min. After n-BuLi was added, the reactor temperature was slowly increased to room temperature, followed by stirring for 12 hr. 12 hr after reaction, an equivalent of methyl(6-t-butoxyhexyl)dichlorosilane (326 g, 350 mL) was rapidly added to the reactor. The reactor temperature was slowly increased to room temperature, followed by stirring for 12 hr. Then, the reactor temperature was cooled to 0° C., and 2 equivalents of t-BuNH$_2$ was added. The reactor temperature was slowly increased to room temperature, followed by stirring for 12 hr. 12 hr after reaction, THF was removed, and 4 L of hexane was added to obtain a filtrate, from which the salt was removed by using the labdori. After the filtrate was added to the reactor, hexane was removed at 70° C. to obtain a yellow solution. It was confirmed by 1H-NMR that the obtained yellow solution was a methyl(6-t-butoxyhexyl)(tetramethylCpH)t-butylaminosilane compound.

TiCl$_3$(THF)$_3$ (10 mmol) was rapidly added to n-BuLi and the dilithium salt of the ligand at –78° C., which was synthesized from the ligand dimethyl(tetramethylCpH)t-butylaminosilane in the THF solution. The reaction solution was stirred for 12 hr while the temperature was slowly increased from –78° C. to room temperature. After stirring was performed for 12 hr, an equivalent of PbCl$_2$ (10 mmol) was added to the reaction solution at room temperature, followed by stirring for 12 hr. After stirring was performed for 12 hr, a dark black solution having the blue color was obtained. After THF was removed from the resulting reaction solution, hexane was added to filter the product. After hexane was removed from the filtrate, it was confirmed by 1H-NMR that the solution was (tBu-O—(CH$_2$)$_6$)(CH$_3$)Si(C$_5$(CH$_3$)$_4$)(tBu-N)TiCl$_2$ which is a desired [methyl(6-t-butoxyhexyl)silyl(η5-tetramethylCp)(t-Butylamido)]TiCl$_2$.

$^1$H-NMR (CDCl$_3$): 3.3 (s, 4H), 2.2 (s, 6H), 2.1 (s, 6H), 1.8~0.8 (m), 1.4 (s, 9H), 1.2(s, 9H), 0.7 (s, 3H)

Preparation Example of Second Metallocene Compound

Synthesis Example 2

Preparation of 3-(6-(tert-butoxy)hexyl)-1H-inden-1-yl)(3-butylcylcopenta-2,4-dien-1-yl) zirconium(IV) chloride

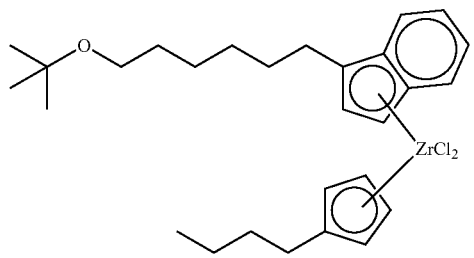

To a 250 mL dried Schlenk flask, 10.8 g (100 mmol) of chlorohexanol was put, and then 10 g of molecular sieve and 100 mL of MTBE (methyl tert-butyl ether) were added, and 20 g of sulfuric acid was slowly added over 30 min. The reaction mixture slowly turned pink over time, and 16 hr later, a saturated sodium bicarbonate solution cooled on ice was poured thereto. This mixture was extracted using 100 ml of ether four times, and a collected organic layer was dried over $MgSO_4$, followed by filtration. The solvent was removed under vacuum to obtain 10 g of 1-(tert butoxy)-6-chlorohexane (60% yield) in the form of a yellow liquid.

1 H NMR (500 MHz, $CDCl_3$): 3.53 (2H, t), 3.33 (2H, t), 1.79 (2H, m), 1.54 (2H, m), 1.45 (2H, m), 1.38 (2H, m), 1.21 (9H, s)

To a 250 mL dried Schlenk flask, 4.5 g (25 mmol) of 1-(tert butoxy)-6-chlorohexane synthesized as above was put and dissolved in 40 mL of THF. 20 mL of sodium indenide in THF solution was slowly added thereto, followed by stirring overnight. This reaction mixture was quenched with 50 mL of water, and extracted with ether (50 mL×3). Then, the collected organic layer was fully washed with brine, and the remaining water was dried over $MgSO_4$, and filtered. The solvent was removed under vacuum to obtain a dark brown sticky product, 3-(6-tert-butoxy hexyl)-1H-indene (quantitative yield).

$Mw$=272.21 g/mol

1H NMR (500 MHz, $CDCl_3$): 7.47 (1H, d), 7.38 (1H, d), 7.31 (1H, t), 7.21 (1H, t), 6.21 (1H, s), 3.36 (2H, m), 2.57 (2H, m), 1.73 (2H, m), 1.57 (2H, m), 1.44 (6H, m), 1.21 (9H, s)

To a 250 mL dried Schlenk flask, 5.44 g (20 mmol) of the prepared 3-(6-tert-butoxy hexyl)-1H-indene was put, and dissolved in 60 mL of ether. 13 mL of n-BuLi in 2.0 M hexane solution was added thereto, followed by stirring overnight. Then, n-butyl cyclopentadiene $ZrCl_3$ in toluene solution (concentration: 0.378 mmol/g) was slowly added at −78° C. When this reaction mixture was raised to room temperature, it changed from a clear brown solution to a white suspension in which yellow solids floated. 12 hr later, 100 mL of hexane was added to the reaction mixture to further produce precipitates, which were then filtered under argon to obtain a yellow filtrate. The filtrate was dried to obtain a desired compound, 3-(6-(tert-butoxy)hexyl)-1H-inden-1-yl)(3-butylcylcopenta-2,4-dien-1-yl) zirconium(IV) chloride.

$Mw$=554.75 g/mol

1H NMR (500 MHz, $CDCl_3$): 7.62 (2H, m), 7.24 (2H, m), 6.65 (1H, s), 6.39 (1H, s), 6.02 (1H, s), 5.83 (1H, s), 5.75 (1H, s), 3.29 (2H, m), 2.99 (1H, m), 2.89 (1H, m), 2.53 (1H, m), 1.68 (2H, m), 1.39-1.64 (10H, m), 1.14 (9H, s), 0.93 (4H, m)

Preparation Example of Hybrid Supported Catalyst

Preparation Example 1

3.0 kg of toluene solution was put in a 20 L sus high-pressure reactor, and the reactor temperature was maintained at 40° C. 500 g of silica (Grace Davison, SP2212) dehydrated under vacuum at 600° C. for 12 hr was added to the reactor, and sufficiently dispersed. Then, 2.78 kg of 10 wt % methylaluminoxane (MAO)/toluene solution was added, followed by stirring at 80° C. and 200 rpm for 15 hr or longer.

The reactor temperature was decreased to 40° C., and then 200 g of 7.8 wt % metallocene compound of Synthesis Example 1/toluene solution was added to the reactor, followed by stirring at 200 rpm for 1 hr. Subsequently, 250 g of 8.7 wt % metallocene compound of Synthesis Example 2/toluene solution was added to the reactor, followed by stirring at 200 rpm for 1 hr.

70 g of a cocatalyst (anilinium tetrakis(pentafluorophenyl)borate) diluted in toluene was added to the reactor, followed by stirring at 200 rpm for 15 hr. The reactor temperature was decreased to room temperature, and then stirring was stopped, followed by settling for 30 min and decantation of the reaction solution.

Toluene slurry was transferred to a filter dryer, and filtered. 3.0 kg of toluene was added, followed by stirring for 10 min. Then, stirring was stopped, and filtration was performed. 3.0 kg of hexane was added to the reactor, followed by stirring for 10 min. Then, stirring was stopped, and filtration was performed. Drying was performed under reduced pressure at 50° C. for 4 hr to prepare 500 g of $SiO_2$-supported catalyst.

Preparation Example 2

A supported catalyst was prepared in the same manner as in Preparation Example 1, except that 125 g of the metallocene compound of Synthesis Example 1/toluene solution was added in Preparation Example 1.

Preparation Example 3

A supported catalyst was prepared in the same manner as in Preparation Example 1, except that 100 g of the metallocene compound of Synthesis Example 1/toluene solution was added in Preparation Example 1.

Example of Ethylene/1-Butene Copolymerization

Examples 1 to 3

Each of the hybrid supported metallocene catalysts prepared in Preparation Examples 1 to 3 was subjected to a unimodal operation using one hexane slurry stirred tank process polymerization device to prepare an ethylene/1-butene copolymer.

The polymerization conditions using the hybrid supported metallocene catalysts in Examples 1 to 3 are summarized in Table 1 below.

TABLE 1

|  | Example 1 | Example 2 | Example 3 |
|---|---|---|---|
| Metallocene catalyst | Preparation Example 1 | Preparation Example 2 | Preparation Example 3 |
| Supply amount of ethylene (kg/hr) | 10.0 | 9.0 | 9.0 |
| Supply amount of 1-butene (ml/min) | 11.5 | 15.1 | 16.0 |
| Supply amount of hydrogen (g/hr) | 3.0 | 3.5 | 3.3 |
| Catalytic activity * (kgPE/g Cat.hr) | 10.4 | 4.5 | 4.9 |

* Catalytic activity (kgPE/gCat.hr): Activity of each catalyst used in Example was determined by measuring the weight of the catalyst used in the copolymerization reaction of Example and the weight of the polymer produced from the reaction.

Comparative Example 1

Dowlex 2388 which is an ethylene/1-octene copolymer available from DOW was used as Comparative Example 1.

Comparative Example 2

SP980 which is an ethylene/1-hexene copolymer available from LG Chem was used as Comparative Example 2.

Comparative Example 3

Hostalen 4731B which is an ethylene/1-butene copolymer available from Basell was used as Comparative Example 3.

Comparative Example 4

QHM22F which is an ethylene/1-hexene copolymer available from Sinopec Qilu was used as Comparative Example 4.

Experimental Example

Evaluation of Physical Properties of Copolymer

The copolymers prepared or purchased in Examples and Comparative Examples were evaluated for their physical properties by the following methods.

1) Density: ASTM 1505
2) Melt Flow Rate (MFR, 2.16 kg/21.6 kg): Measuring temperature 190° C., ASTM 1238
3) MFRR (MFR$_{21.6}$/MFR$_{2.16}$): A ratio obtained by dividing MFR$_{21.6}$ melt flow rate (MI, load: 21.6 kg) by MFR$_{2.16}$ (MI, load: 2.16 kg).
4) Mn, Mw, PDI, GPC curve:

A sample was melted and pre-treated in 1,2,4-trichlorobenzene containing 0.0125% BHT using PL-SP260 at 160° C. for 10 hr, and a number average molecular weight and a weight average molecular weight were measured at a temperature of 160° C. using PL-GPC220. The molecular weight distribution was expressed as the ratio of the weight average molecular weight and the number average molecular weight.

5) FNCT (Full Notch Creep Test):

Measurement was performed according to ISO 16770 which has been conducted until now and described in a document [M. Fleissner in Kunststoffe 77 (1987), pp. 45 et seq.]. At 10% concentration of IGEPAL CO-630 (Etoxilated Nonylphenol, Branched) which is a stress crack accelerating medium using tension of 4.0 MPa at 80° C., due to the shortening of stress initiation time by notch (1.5 mm/safety razor blade), damage time was shortened. Test specimens were manufactured by sawing three test specimens of width 10 mm, height 10 mm, and length 100 mm from compression-molded sheet of 10 mm thickness. In a notch device specifically prepared for this purpose, a center notch was provided to the sample using safety razor blade. The notch depth was 1.5 mm. The time taken until the specimen was cut was measured.

6) BOCD Index and SCB Content:

BOCD index was calculated based on the following Equation 1 by obtaining a molecular weight distribution curve by plotting a log value (log M) of a molecular weight (M) on the x-axis, and a molecular weight distribution (dwt/dlog M) with respect to the log value on the y-axis, and then measuring the SCB (Short Chain Branch) content (content of branches having 2 to 7 carbon atoms per 1,000 carbons, unit: branch/1,000 C) at the left and right borders of centered 60% area excluding 20% of the left and right ends in the total area.

In this regard, the SCB content at a high molecular weight side and the SCB content at a low molecular weight side mean SCB content values at the left and right borders of centered 60% area, respectively. A sample was melted and pre-treated in 1,2,4-trichlorobenzene containing 0.0125% BHT using PL-SP260 at 160° C. for 10 hr, and measured at 160° C. using PerkinElmer Spectrum 100 FT-IR connected with a high-temperature GPC (PL-GPC220).

BOCD Index=SCB content at high molecular weight side−SCB content at low molecular weight side/SCB content at low molecular weight side  [Equation 1]

7) Extrusion amount @50 RPM (kg/hr)

A test was performed using a single extruder with an inner diameter of 45Ø, manufactured by GÖTTFERT. A die size was 60/4 and temperature conditions (° C.) were 190-190-195-195-200-200. A screw compression ratio was 2.4. Extrusion amount was measured at a screw RPM of 50 for 36 sec three times, which was converted to extrusion amount per hr (kg/hr).

8) Tensile strain hardening value

A tensile test was performed in a chamber at 80° C. using Z010 UTM manufactured by Zwick. Test specimens were type 3 specimens which are ISO37 standards with a narrow section length of 16 mm. The specimen was mounted in grips in the chamber, and conditioned for 30 min, followed by measurement. A straight line corresponding to 700~1100% elongation at which strain hardening occurred was taken, and the slope value was defined as a strain hardening constant.

The results are shown in Table 2 below. Further, GPC curves of the copolymers of Examples and Comparative Examples are shown in FIGS. 1 to 7 in order, respectively.

TABLE 2

| | Example 1 | Example 2 | Example 3 | Comparative Example 1 | Comparative Example 2 | Comparative Example 3 | Comparative Example 4 |
|---|---|---|---|---|---|---|---|
| Comonomer | 1-C4 | 1-C4 | 1-C4 | 1-C8 | 1-C6 | 1-C4 | 1-C6 |
| Density (g/cm$^3$) | 0.937 | 0.935 | 0.934 | 0.941 | 0.938 | 0.948 | 0.936 |
| MI$_{2.16}$ (g/10 min) | 0.5 | 0.59 | 0.52 | 0.54 | 0.67 | 0.12 | 0.57 |
| MI$_{21.6}$ (g/10 min) | 16.9 | 24.5 | 23.1 | 27.5 | 21.2 | 9.6 | 10.7 |
| MFRR | 34 | 41 | 44 | 51 | 32 | 83 | 19 |
| Mn (g/mol) | 13,200 | 11,900 | 12,500 | 24,500 | 27,500 | 10,700 | 45,000 |
| Mw (g/mol) | 134,000 | 137,000 | 147,000 | 121,000 | 112,000 | 192,000 | 130,000 |
| PDI | 10.1 | 11.6 | 11.7 | 4.9 | 4.1 | 18 | 2.9 |
| SCB (branch/1,000 C) | 8.4 | 10.1 | 10.1 | 6 | 6.8 | 6.4 | 6.3 |
| BOCD index | 1.2 | 1.56 | 1.81 | 0.77 | 0.9 | 0.74 | 0.25 |
| Extrusion amount @50 RPM (kg/hr) | 20 | 20.3 | 20.6 | 20.4 | 20.1 | 18.7 | 20.8 |
| FNCT @4 MPa, 80° C. (hr) | 1,341 | 1,743 | 2,312 | 4,015 | 2,035 | 837 | 2,215 |
| Strain Hardening Constant 80° C. (gf/cm$^2$) | 0.96 | 0.97 | 0.98 | 0.93 | 0.92 | 0.90 | 0.91 |

Referring to Table 1 and FIGS. 1 to 7, the ethylene/1-butene copolymers of Examples of the present invention satisfied mechanical properties equivalent to those of ethylene/1-hexene copolymer or ethylene/1-octene copolymer while having excellent tensile stress, stress cracking resistance, and processability, as compared with the ethylene/1-butene copolymer of Comparative Example 4.

What is claimed is:

1. An ethylene/1-butene copolymer having a melt flow rate ratio (MFR$_{21.6}$/MFR$_{2.16}$) of 30 to 60, as measured at 190° C. in accordance with ASTM1238,
a molecular weight distribution (Mw/Mn, or PDI) of 8 to 20,
a Broad Orthogonal Co-monomer Distribution (BOCD) index of 1 to 2, and
stress cracking resistance of 1,000 hr to 20,000 hr, as measured by a full notch creep test (FNCT) in accordance with ISO 16770 at 4.0 MPa and 80° C.

2. The ethylene/1-butene copolymer of claim 1, wherein a Short Chain Branch (SCB) content that is a content of branches having 2 to 7 carbon atoms per 1,000 carbons is 5 to 20 branch/1,000 C.

3. The ethylene/1-butene copolymer of claim 1, which has a melt flow rate of MFR$_{2.16}$, as measured in accordance with ASTM D1238 at 190° C. under a load of 2.16 kg, of 0.1 g/10 min to 5 g/10 min, and
a melt flow rate of MFR$_{21.6}$, as measured in accordance with ASTM D1238 at 190° C. under a load of 21.6 kg, of 10 g/10 min to 40 g/10 min.

4. The ethylene/1-butene copolymer of claim 1, which has a weight average molecular weight (Mw) of 10,000 g/mol to 400,000 g/mol.

5. The ethylene/1-butene copolymer of claim 1, wherein the melt flow rate ratio (MFR$_{21.6}$/MFR$_{2.16}$) is 33 to 45.

6. The ethylene/1-butene copolymer of claim 1, wherein the molecular weight distribution (Mw/Mn, or PDI) is 10 to 12.

7. The ethylene/1-butene copolymer of claim 1, wherein the BOCD index is 1.2 to 2.0.

8. The ethylene/1-butene copolymer of claim 1, wherein the ethylene/1-butene copolymer is prepared by copolymerizing ethylene and 1-butene in the presence of a hybrid supported metallocene catalyst including one or more of a first metallocene compound represented by the following Chemical Formula 1; one or more of a second metallocene compound represented by the following Chemical Formula 2; a cocatalyst compound; and a carrier:

[Chemical Formula 1]

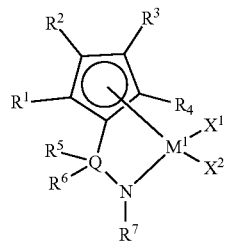

in Chemical Formula 1,

M$^1$ is a Group 4 transition metal,

R$^1$ to R$^7$ are, the same as or different from each other, each independently a functional group selected from the group consisting of hydrogen, an alkyl group having 1 to 20 carbon atoms, an alkoxy group having 1 to 20 carbon atoms, an alkenyl group having 2 to 20 carbon atoms, an alkylalkoxy group having 2 to 20 carbon atoms, an alkoxyalkyl group having 2 to 20 carbon atoms, an aryl group having 6 to 20 carbon atoms, an alkylaryl group having 7 to 20 carbon atoms, and an arylalkyl group having 7 to 20 carbon atoms, wherein two or more adjacent groups are optionally connected to each other to form an aliphatic or aromatic ring unsubstituted or substituted with a hydrocarbyl group having 1 to 10 carbon atoms, X$^1$ and X$^2$ are, the same as or different from each other, each independently halogen or an alkyl group having 1 to 20 carbon atoms, Q is carbon, germanium, or silicon, and N is nitrogen,

[Chemical Formula 2]

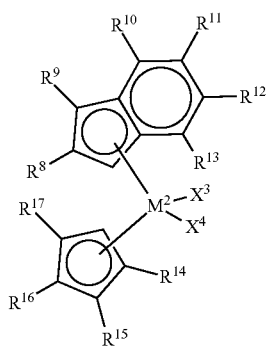

in Chemical Formula 2, $M^2$ is a Group 4 transition metal, at least one of $R^8$ to $R^{13}$ is —$(CH_2)n$—OR, wherein R is a linear or branched alkyl group having 1 to 6 carbon atoms, and n is an integer of 2 to 10, and the rest if present are, the same as or different from each other, each independently hydrogen, an alkyl group having 1 to 20 carbon atoms, an alkenyl group having 2 to 20 carbon atoms, an aryl group having 6 to 20 carbon atoms, an alkylaryl group having 7 to 20 carbon atoms, or an arylalkyl group having 7 to 20 carbon atoms, $R^{14}$ to $R^{17}$ are, the same as or different from each other, each independently hydrogen or an alkyl group having 1 to 20 carbon atoms, and $X^3$ and $X^4$ are, the same as or different from each other, each independently halogen, or an alkyl group having 1 to 20 carbon atoms.

9. The ethylene/1-butene copolymer of claim 8, wherein the compound represented by Chemical Formula 1 is any one of compounds represented by the following structural formulae:

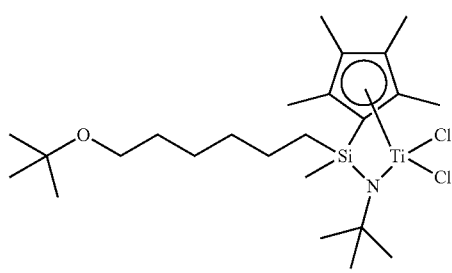

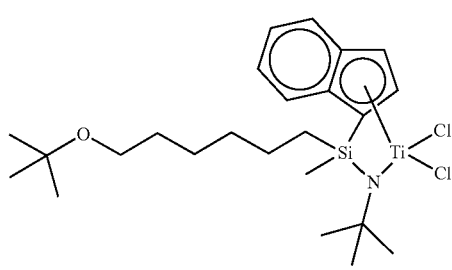

-continued

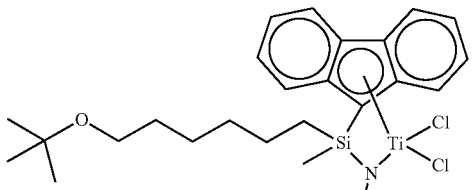

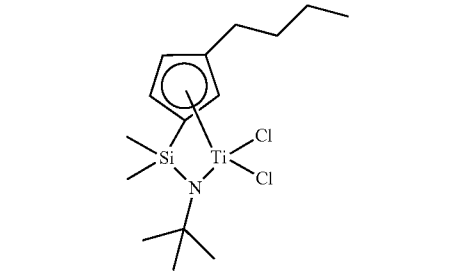

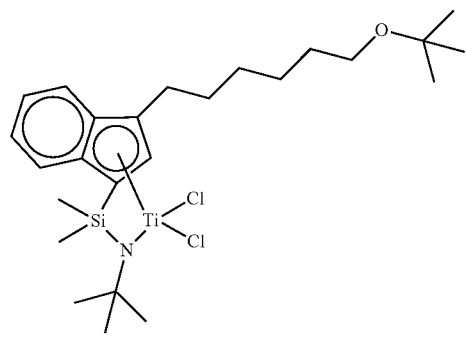

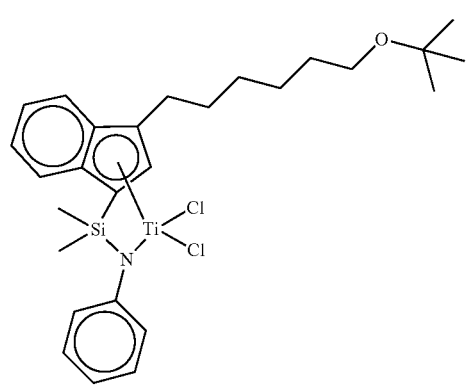

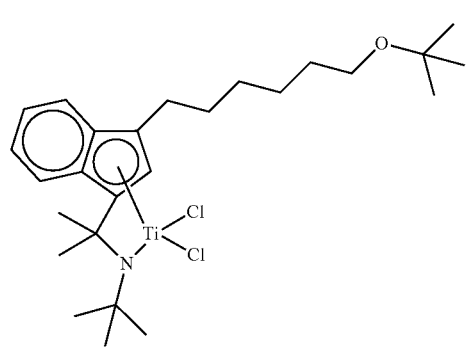

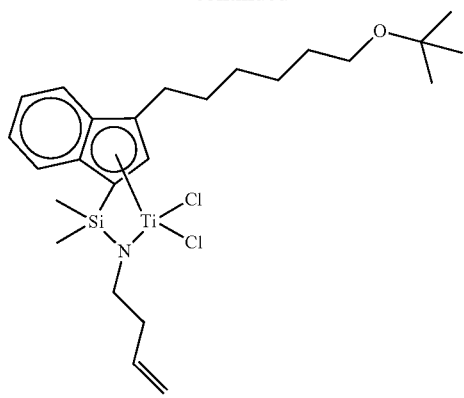

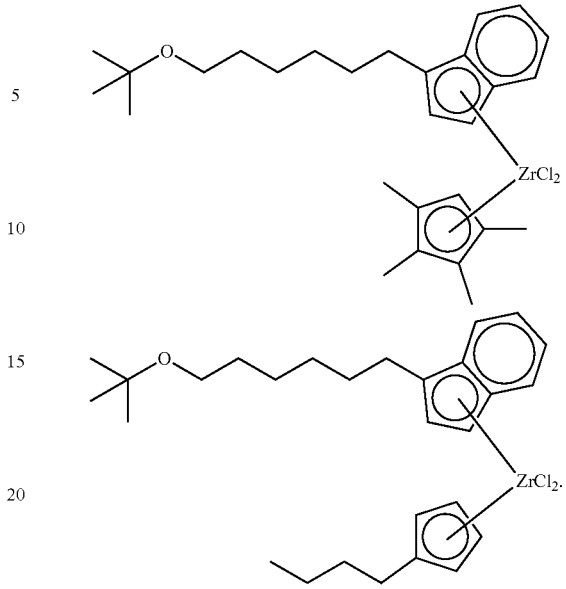

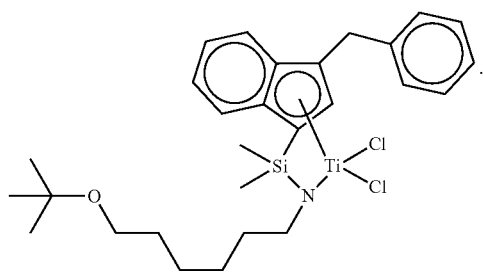

10. The ethylene/1-butene copolymer of claim 8, wherein the compound represented by Chemical Formula 2 is any one of compounds represented by the following structural formulae:

11. The ethylene/1-butene copolymer of claim 1, which has a tensile strain hardening value of 0.94 to 1.00.

12. The ethylene/1-butene copolymer of claim 1, which has a density of 0.930 g/cm² to 0.950 g/cm².

13. The ethylene/1-butene copolymer of claim 1, wherein a content of 1-butene comonomer is about 0.5% by weight to about 10% by weight.

14. The ethylene/1-butene copolymer of claim 8, wherein in Chemical Formula 1, $M^1$ is titanium,
$X^1$ and $X^2$ are Cl,
$R^1$ to $R^5$ are a methyl group,
$R^6$ is a methyl group or a tert-butoxy hexyl group, and
$R^7$ is a tert-butyl group.

15. The ethylene/1-butene copolymer of claim 8, wherein in Chemical Formula 2,
$M^2$ is zirconium,
$X^3$ and $X^4$ are Cl, and
at least one of $R^8$ to $R^{13}$ is a tert-butoxy hexyl group.

* * * * *